H. D. HART.
RESILIENT TIRE FOR VEHICLES.
APPLICATION FILED NOV. 13, 1911.
1,047,407.  Patented Dec. 17, 1912.
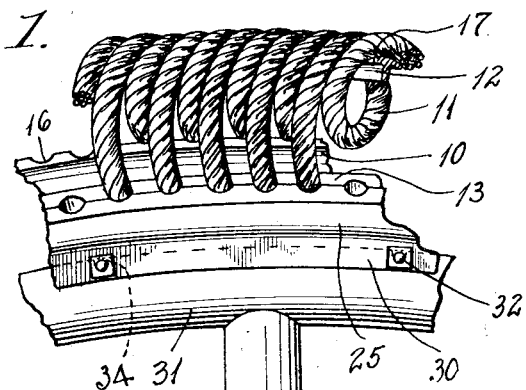
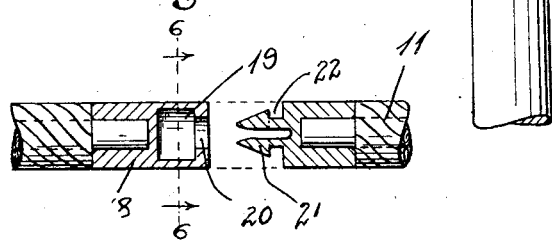
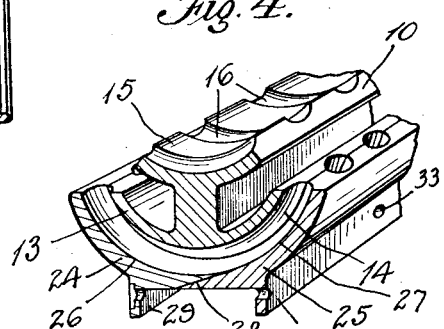
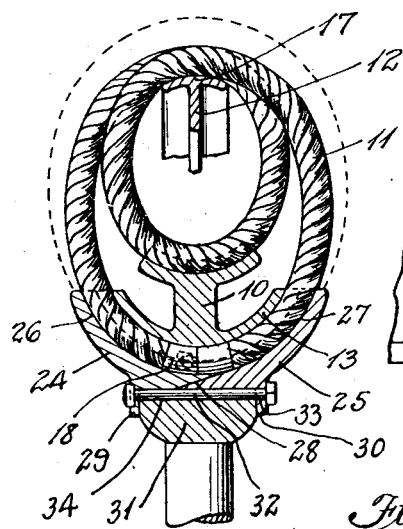
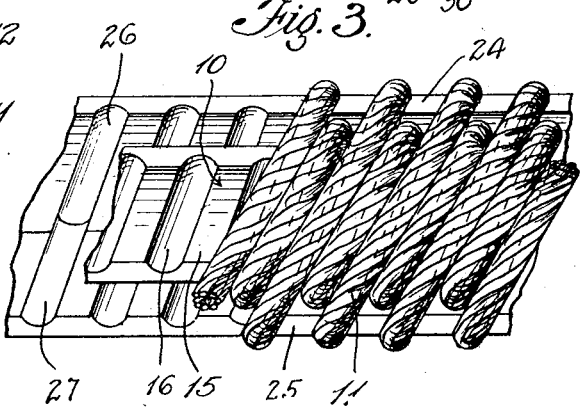
Witnesses  
Inventor  
Harry D. Hart.  
by  
Attys.

UNITED STATES PATENT OFFICE.

HARRY D. HART, OF SAN DIEGO, CALIFORNIA.

RESILIENT TIRE FOR VEHICLES.

1,047,407.  Specification of Letters Patent.  Patented Dec. 17, 1912.

Application filed November 13, 1911. Serial No. 659,959.

*To all whom it may concern:*

Be it known that I, HARRY D. HART, a citizen of the United States, residing at San Diego, in the county of San Diego and State of California, have invented new and useful Improvements in Resilient Tires for Vehicles, of which the following is a specification.

This invention relates to improvements in vehicle tires, and particularly to tires adapted for use upon automobile wheels.

It is an object of the invention to provide a resilient tire, without a pneumatic support, so that the said tire will not be subject to puncture, or the other inconveniences of pneumatic tires, and yet will possess practically the same qualities, and afford ample traction for the wheels.

In the accompanying drawing forming a part of this specification, Figure 1 is a side elevation of a portion of a tire, constructed in accordance with this invention, and applied to the felly of a wheel. Fig. 2 is a transverse sectional view through said tire and the felly of the wheel. Fig. 3 is a top plan view of a portion of the tread of the tire. Fig. 4 is a detail perspective view of a portion of the rim used in holding the resilient portion of the tire. Fig. 5 is an enlarged detail view, partially in section and partially in elevation, of the ends of the cable used in forming the tire, showing the fastening means for securing them together. Fig. 6 is a detail transverse sectional view taken upon the line 6—6 of Fig. 5.

The details and features of the invention will now be more particularly described, reference being had to the said drawing in which—

10 indicates a core rim adapted to have wound thereon a resilient cable portion 11. An extension ring 12 is also employed, and the resilient portion is wound about the said core 10, and the ring 12 in forming the tread portion of the tire, the said ring 12 thus being entirely within the coils of the resilient cable. The resilient portion is preferably formed of a woven wire cable, the strands of which are generally made of resilient steel. The core 10 is formed with a broad curved base 13, having semi-cylindrical grooves 14 upon its inner face, to receive the said resilient cable 11. The cable is wound with large coils or loops and smaller intermediate coils or loops, the intermediate loops resting upon a curved base 15 formed upon the core 10 and having curved grooves 16 upon its face to receive the said intermediate coils. All of the coils pass about the outer curved surface 17 of the ring 12. The resilient cable 11 is thus preferably wound as illustrated in the drawing, and after it has been looped and wound so as to extend entirely around the tire of the wheel, the ends are brought together and fastened, in any suitable or desired manner. For the purpose of readily securing the said ends, one of said ends is formed with a socket member 18, having a recess 19 therein with an entrance opening 20 leading into it. The opposite end of the cable 11 is formed with a bifurcated point or head 21 having a reduced neck portion 22 forming a retaining shoulder upon the said head. The bifurcated structure of the head permits of its being contracted as its tapered outer surface is forced through the opening 20 in the opposite member of the fastener. The opening 20, is preferably provided with an outlet 23 at one end through which the head may be moved laterally, if it is necessary to remove the cable from the tire. With the cable wound upon the core 10 and the rim 12, the tire is completed by the employment of side rims 24 and 25 which have grooves 26 and 27 therein arranged to fit upon the cable 11. The said rims 24 and 25 have inclined meeting faces as indicated at 28 and felly receiving flanges 29 and 30. The said rims are brought together upon opposite sides of the wound core and of the felly 31 of the wheel, the inclined face of said rims being drawn tightly together, and the flanges 29 and 30 being clamped against the sides of the felly 31 by means of bolts 32, which are passed through apertures 33 formed in the said flanges at suitable intervals. The felly is also preferably formed with recesses 34, let into its peripheral surface to receive the said bolts 32, thus preventing any creeping or movement of the tire upon the felly.

What I claim is:—

1. A resilient tire, comprising a woven wire cable coiled transversely of the rim of a wheel, a core having inner and outer grooves for receiving the loops of the coil, and grooved rims fitting upon the inner surface of said core, and adapted to secure the parts to the felly of the wheels.

2. A resilient tire, comprising a core having spirally arranged outer and inner grooves, a spacing ring of larger diameter than the core, a coiled steel cable wound about the said core and ring and having its ends detachably connected, side rims having spirally arranged grooves for fitting upon said cable and core, and having lapping faces, and bolts adapted to bind the said rims upon the felly of a wheel.

3. A resilient tire, comprising a core and spacing ring, a spring cable wound thereon and having a socket member at one end and a split head catch member at the other end adapted to be sprung into said socket member for securing the ends of the cable, the said socket member also having a lateral opening through which the said catch member may be removed, and securing rims adapted to hold the parts together and pass through the tire to the felly of the wheel.

4. A tire construction, comprising an annular tire seat, a tire member mounted therein, said member formed of a metallic cable twisted into a coiled configuration, means to clamp alternate coils of said member to said seat, and an annular endless band mounted in the interior of all of said coils, the periphery of said band contacting with the inner peripheries thereof.

In witness that I claim the foregoing I have hereunto subscribed my name this 4th day of November, 1911.

H. D. HART.

Witnesses:
  EDMUND A. STRAUSE,
  EARLE R. POLLARD.